US012764515B2

(12) United States Patent
Nishizaki

(10) Patent No.: US 12,764,515 B2
(45) **Date of Patent: *Oct. 13, 2026**

(54) TERMINAL MANAGEMENT DEVICE, TERMINAL MANAGEMENT SYSTEM, CONTROL METHOD AND NON-TRANSITORY COMPUTER-READABLE MEDIUM

(71) Applicant: BROTHER KOGYO KABUSHIKI KAISHA, Nagoya (JP)

(72) Inventor: Takashi Nishizaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 1195 days.

This patent is subject to a terminal disclaimer.

(21) Appl. No.: 17/507,713

(22) Filed: Oct. 21, 2021

(65) Prior Publication Data

US 2022/0132293 A1 Apr. 28, 2022

(30) Foreign Application Priority Data

Oct. 27, 2020 (JP) ................................ 2020-179587

(51) Int. Cl.
*H04W 16/26* (2009.01)
*H04W 8/02* (2009.01)

(52) U.S. Cl.
CPC ............. *H04W 8/02* (2013.01); *H04W 16/26* (2013.01)

(58) Field of Classification Search
CPC ....... H04W 8/02; H04W 88/04; H04W 16/26; H04W 84/047; H04B 7/2606; H04B 7/155
See application file for complete search history.

(56) References Cited

U.S. PATENT DOCUMENTS

| | | | | |
|---|---|---|---|---|
| 6,240,456 | B1 * | 5/2001 | Teng | G06C 10/10 709/225 |
| 9,961,298 | B2 * | 5/2018 | Soneda | H04N 7/147 |
| 2002/0161740 | A1 | 10/2002 | Nakamura et al. | |
| 2004/0017580 | A1 * | 1/2004 | Kuroda | G06F 3/1204 358/1.15 |

(Continued)

FOREIGN PATENT DOCUMENTS

| | | | |
|---|---|---|---|
| JP | 2012-203430 | A | 10/2012 |
| JP | 2014-78083 | A | 5/2014 |

(Continued)

OTHER PUBLICATIONS

Japanese Office Action for the related Japanese Patent Application No. 2020-179587 dated May 28, 2024.

(Continued)

*Primary Examiner* — Hassan A Phillips
(74) *Attorney, Agent, or Firm* — KENEALY VAIDYA LLP

(57) ABSTRACT

A terminal management device in a terminal management system includes: a controller configured to perform: a first control of determining whether a first terminal device is in a state capable of transmitting information to a terminal management device via a relay device, and a second control of determining whether a second terminal device is in a state capable of transmitting information to the terminal management device, the second control being different from the first control.

21 Claims, 8 Drawing Sheets

(56) References Cited

U.S. PATENT DOCUMENTS

| | | | | |
|---|---|---|---|---|
| 2008/0021991 | A1* | 1/2008 | Kawai | H04L 41/00 709/223 |
| 2011/0170461 | A1* | 7/2011 | Iida | H04B 7/2606 370/280 |
| 2012/0050794 | A1* | 3/2012 | Ikeda | G06F 3/1232 358/1.15 |
| 2012/0201190 | A1* | 8/2012 | Sawai | H04W 16/26 370/315 |
| 2012/0236359 | A1* | 9/2012 | Mihara | G06F 3/1205 358/1.15 |
| 2012/0309291 | A1* | 12/2012 | Sawai | H04B 7/15542 455/7 |
| 2013/0058345 | A1* | 3/2013 | Kano | H04L 45/74 370/392 |
| 2014/0003329 | A1* | 1/2014 | Chen | H04W 72/20 370/315 |
| 2015/0036584 | A1* | 2/2015 | Ushiki | H04L 67/568 370/315 |
| 2015/0222349 | A1* | 8/2015 | Sloan | H04W 4/40 455/7 |
| 2015/0242987 | A1* | 8/2015 | Lee | G06T 1/20 345/522 |
| 2015/0373134 | A1 | 12/2015 | Shimakawa | |
| 2016/0248630 | A1 | 8/2016 | Roberts | |
| 2016/0366292 | A1* | 12/2016 | Anezaki | H04W 8/005 |
| 2017/0331670 | A1* | 11/2017 | Parkvall | H04L 41/0233 |
| 2019/0069236 | A1* | 2/2019 | Alieiev | H04W 76/28 |
| 2019/0082058 | A1* | 3/2019 | Aoki | H04N 1/32406 |
| 2019/0132196 | A1* | 5/2019 | Trivedi | H04W 74/02 |
| 2019/0319922 | A1 | 10/2019 | Nishizaki | |
| 2020/0092685 | A1* | 3/2020 | Fehrenbach | H04W 84/047 |
| 2021/0212164 | A1 | 7/2021 | Nishizaki | |

FOREIGN PATENT DOCUMENTS

| | | | |
|---|---|---|---|
| JP | 2016-115201 | A | 6/2016 |
| JP | 2017-536598 | A | 12/2017 |
| JP | 2019-185524 | A | 10/2019 |
| WO | 01/73558 | A1 | 10/2001 |
| WO | 2013/145516 | A1 | 10/2013 |
| WO | 2016/048417 | A1 | 3/2016 |
| WO | 2017/122364 | A1 | 7/2017 |

OTHER PUBLICATIONS

Japanese Office Action for the related Japanese Patent Application No. 2020-001473 dated Feb. 13, 2024.

* cited by examiner

FIG. 3A

| CLIENT ID | ACTION CONFIRMATION INTERVAL | FINAL ACTION CONFIRMATION TIME | VERSION | CLIENT TYPE | *** |
|---|---|---|---|---|---|
| AAA | 1 minite | 2019/8/21/17:00:00 | 1.12 | SERVICE | *** |
| BBB | 1 minite | 2019/8/21/17:00:10 | 1.11 | PRINTER | *** |

FIG. 3B

| ACTION ID | ACTION TYPE | PERIODIC FLAG | ACTION CONTENT |
|---|---|---|---|
| ACTION A | CHECK STATUS | true | Interval=30min. |
| ACTION B | TEST PRINTING | false | - |
| ACTION C | UPDATE CHECK ACTION TIME | false | Interval=45sec. |
| ACTION D | FILE INSTALLATION | false | File URL = ***** |

FIG. 3C

| DEVICE ID | CLIENT ID | MODEL NAME | SERIAL NUMBER | FIRMWARE VERSION | PARAMETER | *** |
|---|---|---|---|---|---|---|
| 111 | AAA | AA-AAAAAA | A1A111111 | 1.12 | Print Speed=***, …, …, | |
| 222 | AAA | BB-BBBBBB | B2B222222 | 1.00 | Print Speed=***, …, …, | |
| 333 | BBB | CC-CCCCCC | C3C333333 | 1.11 | Print Speed=***, …, …, | |

FIG. 3D

| CLIENT ID | ACTION ID |
|---|---|
| AAA | ACTION A |
| AAA | ACTION C |
| BBB | ACTION C |

FIG. 3E

| DEVICE ID | ACTION ID |
|---|---|
| 111 | ACTION B |
| 222 | ACTION D |

TERMINAL MANAGEMENT DEVICE, TERMINAL MANAGEMENT SYSTEM, CONTROL METHOD AND NON-TRANSITORY COMPUTER-READABLE MEDIUM

CROSS-REFERENCE TO RELATED APPLICATIONS

This application claims priority from Japanese Patent Application No. 2020-179587 filed on Oct. 27, 2020, the entire contents of which are incorporated herein by reference.

TECHNICAL FIELD

Aspects of the present disclosure relate to a terminal management device, a terminal management system, a control method and a non-transitory computer-readable medium.

BACKGROUND

There is a related-art technology in which a printer having no function of directly connecting to the Internet is managed by a management server connected to the Internet.

The related-art technology described above is not a technology in which a printer having a function of directly connecting to the Internet. There is not a technology for appropriately managing printers in an environment where the printer having no function of directly connecting to the Internet and the printer having a function of directly connecting to the Internet are mixed.

SUMMARY

Aspects of the present disclosure provide a terminal management device, a terminal management system, a control method and a non-transitory computer-readable medium capable of appropriately managing terminal devices having a difference in communication function.

A first aspect of the present disclosure is a terminal management device in a terminal management system. The terminal management system includes: the terminal management device, a relay device, a first terminal device and a second terminal device. A first system including the terminal management device, the relay device and the first terminal device and a second system including the terminal management device and the second terminal device coexist. The first system is configured such that the terminal management device and the relay device are capable of communicating with each other and that the relay device and the first terminal device are capable of communicating with each other, and thereby the terminal management device and the first terminal device are capable of transmitting information therebetween via the relay device. The second system is configured such that the terminal management device and the second terminal device are capable of communicating with each other, and thereby the terminal management device and the second terminal device are capable of transmitting information therebetween without passing through the relay device. The terminal management device includes: a controller configured to perform: a first control of determining whether the first terminal device is in a state capable of transmitting the information to the terminal management device via the relay device, and a second control of determining whether the second terminal device is in a state capable of transmitting the information to the terminal management device, the second control being different from the first control.

According to the terminal management device configured as described above, the terminal management device determines whether the first terminal device is in the state capable of transmitting the information to the terminal management device via the relay device in the first control for the first terminal device. In addition, the terminal management device determines whether the second terminal device is in the state capable of transmitting the information to the terminal management device in the second control different from the first control for the second terminal device. Therefore, although the first system and the second system having different information transmission paths are mixed, each of the first terminal device and the second terminal device can be appropriately managed.

A second aspect of the present disclosure is a terminal management system including:

a terminal management device; a relay device; a first terminal device; and a second terminal device. A first system including the terminal management device, the relay device and the first terminal device and a second system including the terminal management device and the second terminal device coexist. The first system is configured such that the terminal management device and the relay device are capable of communicating with each other and that the relay device and the first terminal device are capable of communicating with each other, and thereby the terminal management device and the first terminal device are capable of transmitting information therebetween via the relay device. The second system is configured such that the terminal management device and the second terminal device are capable of communicating with each other, and thereby the terminal management device and the second terminal device are capable of transmitting information therebetween without passing through the relay device. The terminal management device includes a controller configured to perform: a first control of determining whether the first terminal device is in a state capable of transmitting the information to the terminal management device via the relay device, and a second control of determining whether the second terminal device is in a state capable of transmitting the information to the terminal management device, the second control being different from the first control.

According to the terminal management system configured as described above, the terminal management device functions as described above. Therefore, although the first system and the second system having different information transmission paths are mixed, each of the first terminal device and the second terminal device can be appropriately managed.

A third aspect of the present disclosure is a control method executed by a terminal management device in a terminal management system. The terminal management system includes: the terminal management device, a relay device, a first terminal device and a second terminal device. A first system including the terminal management device, the relay device and the first terminal device and a second system including the terminal management device and the second terminal device coexist. The first system is configured such that the terminal management device and the relay device are capable of communicating with each other and that the relay device and the first terminal device are capable of communicating with each other, and thereby the terminal management device and the first terminal device are capable of transmitting information therebetween via the relay device. The second system is configured such that the terminal management device and the second terminal device are capable of communicating with each other, and thereby the terminal management device and the second terminal device are capable of transmitting information therebetween without passing through the relay device. The control method includes: a first control of determining whether the first terminal device is in a state capable of transmitting the information to the terminal management device via the relay device; and a second control of determining whether the second terminal device is in a state capable of transmitting the information to the terminal management device, the second control being different from the first control.

According to the control method configured as described above, the above-described control is executed in the terminal management device. Therefore, although the first system and the second system having different information transmission paths are mixed, each of the first terminal device and the second terminal device can be appropriately managed.

A fourth aspect of the present disclosure is a non-transitory computer-readable medium storing instructions readable by a processor of a terminal management device in a terminal management system including: the terminal management device, a relay device, a first terminal device and a second terminal device, in which a first system including the terminal management device, the relay device and the first terminal device and a second system including the terminal management device and the second terminal device coexist. The first system is configured such that the terminal management device and the relay device are capable of communicating with each other and that the relay device and the first terminal device are capable of communicating with each other, and thereby the terminal management device and the first terminal device are capable of transmitting information therebetween via the relay device. The second system is configured such that the terminal management device and the second terminal device are capable of communicating with each other, and thereby the terminal management device and the second terminal device are capable of transmitting information therebetween without passing through the relay device. The instructions, when executed by the processor, cause the terminal management device to perform: a first control of determining whether the first terminal device is in a state capable of transmitting the information to the terminal management device via the relay device, and a second control of determining whether the second terminal device is in a state capable of transmitting the information to the terminal management device, the second control being different from the first control.

According to the non-transitory computer-readable medium configured as described above, the terminal management device can function as described above. Therefore, although the first system and the second system having different information transmission paths are mixed, each of the first terminal device and the second terminal device can be appropriately managed.

BRIEF DESCRIPTION OF DRAWINGS

FIG. 3A is an explanatory diagram showing an example of a client table.

FIG. 3B is an explanatory diagram showing an example of an action table.

FIG. 3C is an explanatory diagram showing an example of a device table.

FIG. 3D is an explanatory diagram showing an example of a client-action intermediate table.

FIG. 3E is an explanatory diagram showing an example of a device-action intermediate table.

DETAILED DESCRIPTION

A terminal management device, a terminal management system, a control method and a non-transitory computer-readable medium. according to the present disclosure will be described with reference to exemplary embodiments.

(1) Configuration of Terminal Management System 1

Figure 1:
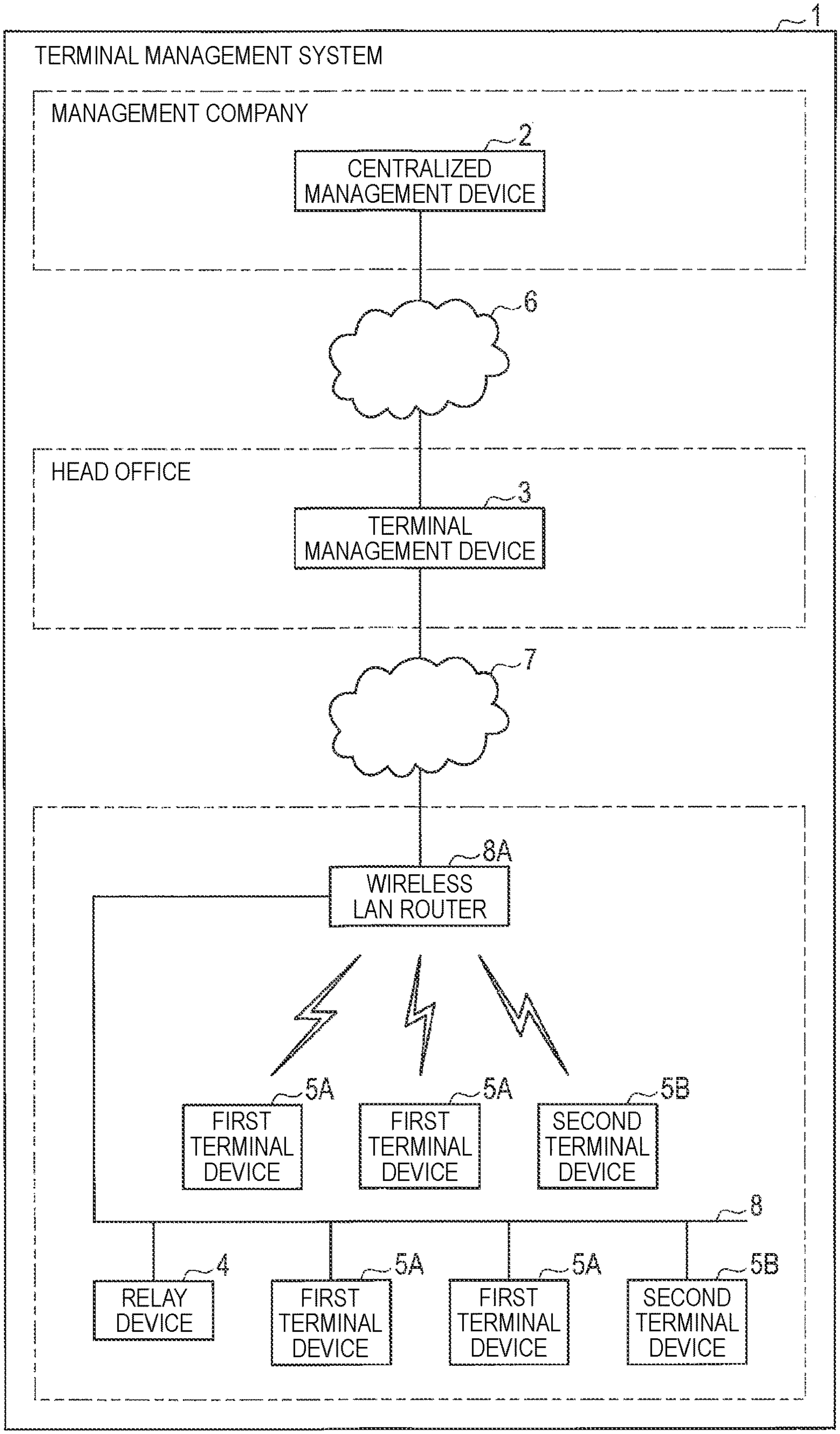
FIG. 1 is a block diagram showing a configuration of a terminal management system.

As shown in FIG. 1, a terminal management system 1 includes a centralized management device 2, a terminal management device 3, a relay device 4, a first terminal device 5A and a second terminal device 5B. In the following description, when it is not necessary to explicitly distinguish between the first terminal device 5A and the second terminal device 5B, the first terminal device 5A and the second terminal device 5B are also each referred to as a terminal device 5. As shown in FIG. 1, the centralized management device 2 and the terminal management device 3 are capable of communicating with each other via a WAN 6. The terminal management device 3 and the relay device 4 are capable of communicating with each other via a WAN 7 and a LAN 8. The relay device 4 and the first terminal device 5A are capable of communicating with each other via the LAN 8. The terminal management device 3 and the second terminal device 5B are capable of communicating with each other via the WAN 7 and the LAN 8. The WAN is an abbreviation for Wide Area Network. The LAN is an abbreviation for Local Area Network. The WAN 6 and the WAN 7 may be the same network or different networks. In the present embodiment, both the WAN 6 and the WAN 7 use the Internet.

The WAN 7 and the LAN 8 are connected via a wireless LAN router 8A. The wireless LAN router 8A is a device having both a router function and a wireless LAN access point function. The wireless LAN router 8A has a firewall function and is configured to prevent unauthorized access from a WAN 7 side to a LAN 8 side. A LAN cable is connected to the wireless LAN router 8A. The LAN 8 is configured by combining both a wired LAN and a wireless LAN.

The terminal device 5 may include a terminal device 5 connectable to the wireless LAN and a terminal device 5 connectable to the wired LAN. Examples of the terminal device 5 connectable to the wireless LAN include a printer used in cooperation with a mobile terminal (hereinafter, also referred to as a mobile printer). When the terminal device 5 connectable to the wireless LAN is present within a communication range with the wireless LAN router 8A, a communication link with the wireless LAN router 8A is established and incorporated into the terminal management system 1. Examples of the terminal device 5 connectable to the wired LAN include a printer and a multi-function peripheral (MFP) that are not compatible with the wireless LAN.

In the terminal management system 1 according to the present embodiment, for example, the centralized management device 2 can collect information from the terminal device 5, and the centralized management device 2 can remotely control the terminal device 5 to perform test printing, restarting the terminal device 5 and shutting down the terminal device 5. In the present embodiment, the terminal management device 3 is configured to function as a server device in a client/server system. Each of the centralized management device 2, the relay device 4 and the second terminal device 5B is configured to function as a client device in the client/server system. When information is transmitted between the terminal management device 3 and each of the centralized management device 2, the relay device 4 and the second terminal device 5B, the information is transmitted from the client device to the server device, and as a response, the information is transmitted from the server device to the client device. On the other hand, the first terminal device 5A does not have a function of communicating with other devices via the WAN 7. Therefore, information is transmitted between the terminal management device 3 and the first terminal device 5A via the relay device 4.

As an example of a place where devices constituting the terminal management system 1 is installed, it is conceivable that the terminal management device 3 is installed at a head office of a company A, and the relay device 4 and the terminal device 5 are installed at a branch office of the company A. In this case, information (hereinafter, also referred to as terminal information) on a plurality of terminal devices 5 operated at the branch office of the company A is collected by the terminal management device 3 installed at the head office of the company A. The terminal information collected by the terminal management device 3 is collected and managed by, for example, the centralized management device 2 operated by a management company different from the company A. However, the centralized management device 2 may be operated by the company A, and it is optional whether the company A and the management company are different companies.

Although not shown in FIG. 1, a plurality of terminal management devices 3 may be provided. In this case, the plurality of terminal management devices 3 may be configured to be managed by one centralized management device 2. For example, the terminal management device 3 may be installed in each of companies B, C, D, . . . , different from the company A, and the plurality of terminal management devices 3 may be managed by one centralized management device 2 installed in the management company.

Although not shown in FIG. 1, a plurality of relay devices 4 may be provided. In this case, the plurality of relay devices 4 may be configured to be managed by one terminal management device 3. For example, when the company A has a plurality of branch offices, the relay device 4 may be installed at each branch office, and the plurality of relay devices 4 may be managed by one terminal management device 3 installed at the head office.

Figure 2A:
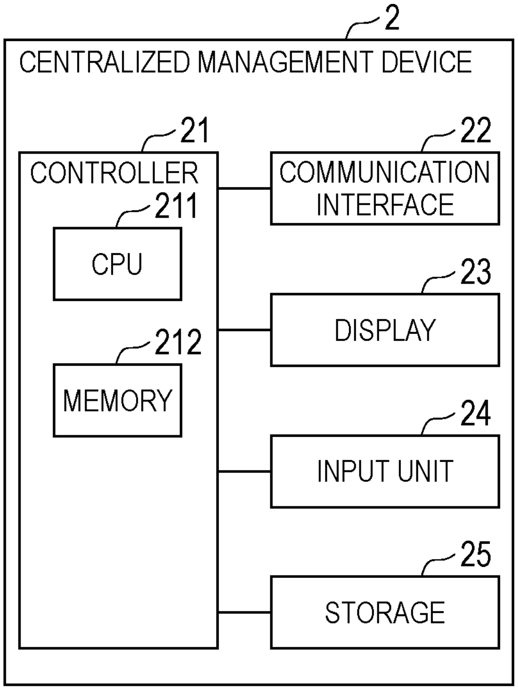
FIG. 2A is a block diagram showing a configuration of a centralized management device.

As shown in FIG. 2A, the centralized management device 2 includes a controller 21, a communication interface 22, a display 23, an input unit 24 and a storage 25. The controller 21 includes a CPU 211 and a memory 212. The CPU 211 executes processing and control according to software stored in the memory 212, thereby realizing various functions of the centralized management device 2. However, the various functions of the centralized management device 2 are not limited to those realized by the CPU 211 and the software, and some or all of the functions may be realized by one or more pieces of hardware.

The memory 212 includes a semiconductor memory that is a non-transitory tangible storage medium (for example, a ROM, a RAM, an NVRAM and a flash memory). The memory 212 stores software and data. The communication interface 22 includes a network interface controller connected to the WAN 6 and capable of performing communication via the WAN 6. The display 23 includes a display device (for example, a liquid crystal display or an organic EL display), and is configured to display various images. The input unit 24 includes an input device that receives various input operations and an input controller that processes input from the input device. The storage 25 includes an auxiliary storage such as a hard disk drive (HDD) or a solid state drive (SSD).

Figure 2B:
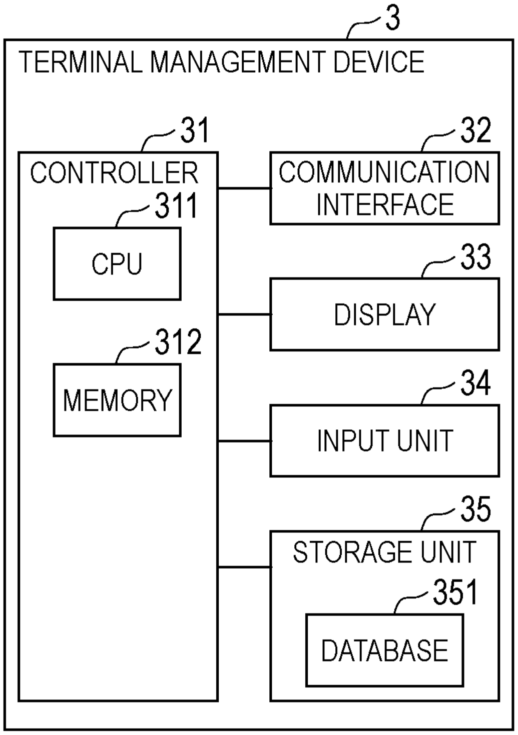
FIG. 2B is a block diagram showing a configuration of a terminal management device.

As shown in FIG. 2B, the terminal management device 3 includes a controller 31, a communication interface 32, a display 33, an input unit 34 and a storage 35. The controller 31 includes a CPU 311 and a memory 312. The CPU 311 executes processing and control according to software stored in the memory 312, thereby realizing various functions of the terminal management device 3. However, the various functions of the terminal management device 3 are not limited to those realized by the CPU 311 and the software, and some or all of the functions may be realized by one or more pieces of hardware.

The memory 312 includes a semiconductor memory that is a non-transitory tangible storage medium (for example, a ROM, a RAM, an NVRAM and a flash memory). The memory 312 stores software and data. The communication interface 32 includes a network interface controller connected to the WAN 6 and capable of performing communication via the WAN 6. In the present embodiment, since the WAN 6 and the WAN 7 are the same network, the communication interface 32 is connected to the WAN 7 and performs communication via the WAN 7. The display 33 includes a display device (for example, a liquid crystal display or an organic EL display), and is configured to display various images. The input unit 34 includes an input device that receives various input operations and an input controller that processes input from the input device. The storage 35 includes an auxiliary storage such as an HDD or an SSD. A database 351 is configured in the storage 35 (hereinafter, the database 351 is abbreviated as DB 351).

When the terminal management device 3 executes processing to be described later, various types of data are registered in the DB 351, and the data is updated and deleted. In the DB 351, a client table as shown in FIG. 3A, an action table as shown in FIG. 3B, a device table as shown in FIG. 3C, a client-action intermediate table as shown in FIG. 3D and a device-action intermediate table as shown in FIG. 3E are ensured. Details of these tables will be described later.

Figure 2C:
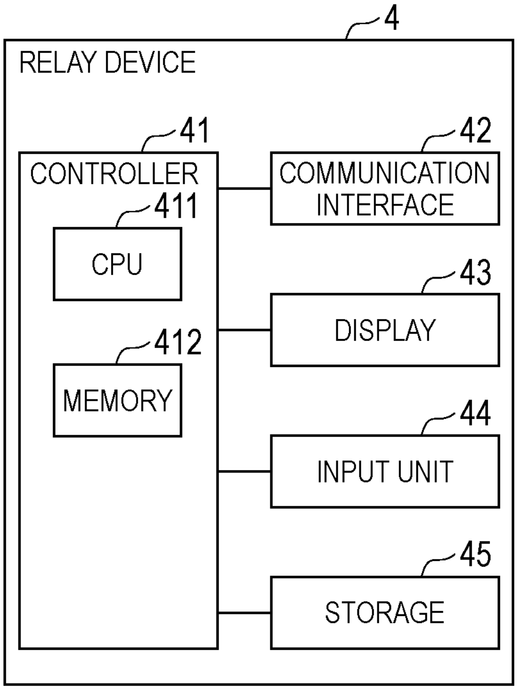
FIG. 2C is a block diagram showing a configuration of a relay device.

As shown in FIG. 2C, the relay device 4 includes a controller 41, a communication interface 42, a display 43, an input unit 44 and a storage 45. The controller 41 includes a CPU 411 and a memory 412. The CPU 411 executes processing and control according to software stored in the memory 412, thereby realizing various functions of the relay device 4. However, the various functions of the relay device 4 are not limited to those realized by the CPU 411 and the software, and some or all of the functions may be realized by one or more pieces of hardware.

The memory 412 includes a semiconductor memory that is a non-transitory tangible storage medium (for example, a ROM, a RAM, an NVRAM and a flash memory). The memory 412 stores software and data. The communication interface 42 includes a network interface controller connected to the WAN 7 and capable of performing communication via the WAN 7, and a network interface controller connected to the LAN 8 and capable of performing communication via the LAN 8. The display 43 includes a display device (for example, a liquid crystal display or an organic EL display), and is configured to display various images. The input unit 44 includes an input device that receives various input operations and an input controller that processes input from the input device. The storage 45 includes an auxiliary storage such as an HDD or an SSD.

Figure 2D:
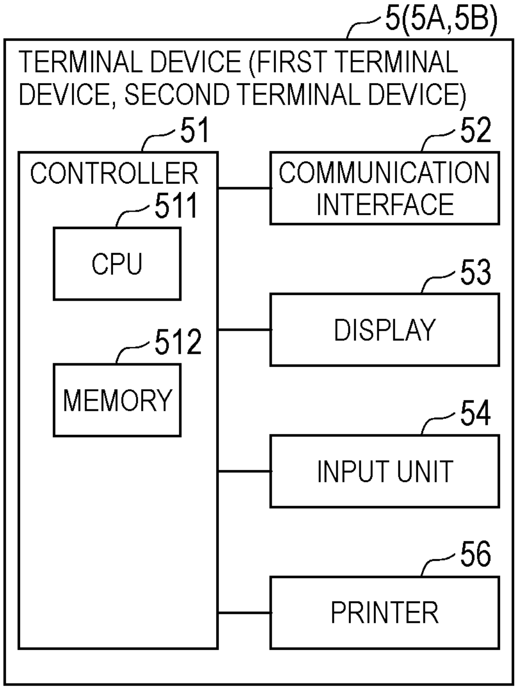
FIG. 2D is a block diagram showing a configuration of a terminal device.

As shown in FIG. 2D, the terminal device 5 includes a controller 51, a communication interface 52, a display 53, an input unit 54 and a printer 56. The first terminal device 5A and the second terminal device 5B are different from each other in terms of hardware performance and firmware and software installed in each device. However, these differences are not shown in FIG. 2D. The controller 51 includes a CPU 511 and a memory 512. The CPU 511 executes processing and control according to software stored in the memory 512, thereby realizing various functions of the terminal device 5. However, the various functions of the terminal device 5 are not limited to those realized by the CPU 511 and the software, and some or all of the functions may be realized by one or more pieces of hardware.

The memory 512 includes a semiconductor memory that is a non-transitory tangible storage medium (for example, a ROM, a RAM, an NVRAM and a flash memory). The memory 512 stores software and data. The communication interface 52 includes a network interface controller connected to the LAN 8 and capable of performing communication via the LAN 8. For example, when the terminal device 5 is a mobile printer compatible with a wireless LAN, a network interface controller compatible with a wireless LAN standard is provided as the communication interface 52. When the terminal device 5 is a printer compatible with a wired LAN, a network interface controller compatible with a wired LAN standard is provided as the communication interface 52.

The display 53 includes a display device (for example, a liquid crystal display or an organic EL display), and is configured to display various images. The input unit 54 includes an input device that receives various input operations and an input controller that processes input from the input device. The printer 56 includes a thermal type printing mechanism, and is capable of printing on thermal roll paper. However, the printer 56 may be capable of printing on cut paper. Alternatively, an image may be printed by a well-known recording method other than a thermal method (for example, an inkjet method or an electrophotographic method).

(2) Overview of Operation of Terminal Management System 1

In the present embodiment, the terminal management system 1 operates as follows. When a relay processing program is installed in a computer and the relay processing program is started, the computer starts processing as the relay device 4. When the relay processing program is started, the relay device 4 accesses the terminal management device 3 via the WAN 7, and transmits a registration request of the relay device 4 to the terminal management device 3. When the second terminal device 5B is started, the second terminal device 5B accesses the terminal management device 3 via the WAN 7, and transmits a registration request of the second terminal device 5B to the terminal management device 3.

Upon receiving the registration request from the relay device 4 or the second terminal device 5B, the terminal management device 3 executes client registration processing. In the client registration processing, the terminal management device 3 determines whether a transmission source of the above registration request (that is, the relay device 4 or the second terminal device 5B) has already been registered in the DB 351. If the transmission source is in an unregistered state in the terminal management device 3, information on the transmission source is registered in the DB 351.

Next, as an action to be executed by each of the relay device 4 and the second terminal device 5B, the terminal management device 3 registers, in the DB 351, action information indicating that periodic processing is to be executed. The action information is registered in the DB 351 as periodic information. The periodic information is information in which a state registered in the DB 351 is maintained without being deleted unless deletion is instructed by a command transmitted from the centralized management device 2 to the terminal management device 3 or a command input by a user operation in the terminal management device 3. When each of the relay device 4 and the second terminal device 5B starts to operate, each of the relay device 4 and the second terminal device 5B executes the periodic processing, and periodically inquires of the terminal management device 3 whether there is an action to be executed by each of the relay device 4 and the second terminal device 5B.

In response to the inquiry, when action information on the action to be executed by each of the relay device 4 and the second terminal device 5B is registered in the DB 351, the terminal management device 3 returns the action information to each of the relay device 4 and the second terminal device 5B. At the first time of the inquiry from each of the relay device 4 and the second terminal device 5B, action information indicating that the above periodic processing is to be executed is returned to the relay device 4 and the second terminal device 5B.

The relay device 4 and the second terminal device 5B acquire the action information indicating that the periodic processing is to be executed, and thereafter, the relay device 4 and the second terminal device 5B repeatedly execute the periodic processing each time an interval elapses according to setting of the interval included in the action information.

The relay device 4 searches the LAN 8 for the first terminal device 5A to be managed by a simple network management protocol (SNMP). When the first terminal device 5A to be managed is found, a registration request of terminal information on the first terminal device 5A is transmitted to the terminal management device 3. Upon receiving the registration request of the terminal information, the terminal management device 3 registers the terminal information in the DB 351.

When a command to the relay device 4, the first terminal device 5A or the second terminal device 5B is input by a user operation in the centralized management device 2, the command is transmitted from the centralized management device 2 to the terminal management device 3. In addition, a command to the relay device 4, the first terminal device 5A or the second terminal device 5B may be input by a user operation in the terminal management device 3. Upon receiving the command transmitted from the centralized management device 2 or the command input in the terminal management device 3, the terminal management device 3 executes an instruction storage processing.

In the instruction storage processing, action information corresponding to the command transmitted from the centralized management device 2 or the command input in the terminal management device 3 is registered in the DB 351. The action information includes action information registered as periodical information as described above, and action information registered as temporary information. The temporary information is information that is subsequently deleted from the DB 351 when processing corresponding to the temporary information is executed in the first terminal device 5A or the second terminal device 5B.

For example, when the command transmitted from the centralized management device 2 to the terminal management device 3 or the command input by the user operation in the terminal management device 3 is a command for test printing in or restarting the first terminal device 5A or the second terminal device 5B, the terminal management device 3 registers action information corresponding to the command to the first terminal device 5A or the second terminal device 5B in the DB 351. The action information is registered in the DB 351 as temporary information.

As described above, the relay device 4 and the second terminal device 5B periodically inquire of the terminal management device 3 whether there is an action to be executed by the relay device 4. In response to the inquiry, when the above temporary information is registered in the DB 351, the terminal management device 3 returns the action information (that is, the temporary information) to the relay device 4 or the second terminal device 5B. In a case of the relay device 4, the relay device 4 transmits a command to the first terminal device 5A based on the returned action information. Thereby, in the first terminal device 5A, test printing and restart are executed. In a case of the second terminal device 5B, the second terminal device 5B executes test printing and restart based on the returned action information.

When processing in the first terminal device 5A is executed, the relay device 4 transmits the execution result and an action deletion request that intends to complete an action in the first terminal device 5A to the terminal management device 3. When processing in the second terminal device 5B is executed, the second terminal device 5B transmits the execution result and an action deletion request that intends to complete an action in the second terminal device 5B to the terminal management device 3. The terminal management device 3 deletes information corresponding to the deletion request from the DB 351.

When a user wants to change the interval of the periodic processing periodically executed in the relay device 4 and the second terminal device 5B, action information instructing a change in the interval of the periodic processing can be registered in the DB 351 according to the command transmitted from the centralized management device 2 to the terminal management device 3 or the command input by the user operation in the terminal management device 3. The action information is registered in the DB 351 as temporary information.

As described above, the relay device 4 and the second terminal device 5B periodically inquire of the terminal management device 3 whether there is an action to be executed by the relay device 4. In response to the inquiry, when the above temporary information is registered in the DB 351, the terminal management device 3 returns the action information (that is, the temporary information) to the relay device 4 or the second terminal device 5B. The relay device 4 and the second terminal device 5B change the interval of the periodic processing executed by each of the relay device 4 and the second terminal device 5B based on the returned action information. When the interval is changed, each of the relay device 4 and the second terminal device 5B transmits an action deletion request that intends to complete an action in each of the relay device 4 and the second terminal device 5B to the terminal management device 3. The terminal management device 3 deletes information corresponding to the deletion request from the DB 351. Upon receiving an interval change instruction, each of the relay device 4 and the second terminal device 5B resumes the periodic processing at the instructed interval.

The tables shown in FIGS. 3A to 3E are used by the terminal management device 3 when executing the above processing. The client table (see FIG. 3A) is a table in which information on the relay device 4 and the second terminal device 5B serving as client devices is registered. In an example shown in FIG. 3A, one relay device 4 and one second terminal device 5B are registered in the client table, and "AAA" and "BBB" are assigned as client IDs for identifying the relay device 4 and the second terminal device 5B, respectively. An action confirmation interval is an interval when each of the relay device 4 and the second terminal device 5B accesses the terminal management device 3 in order for the relay device 4 and the second terminal device 5B to receive action information from the terminal management device 3. In an example shown in FIG. 3A, each of the relay device 4 and the second terminal device 5B accesses the terminal management device 3 at an interval of 1 minute. A client type is information indicating whether a device corresponding to a client ID is the relay device 4 or the second terminal device 5B. When the device corresponding to the client ID is the relay device 4, the client type is a service. When the device corresponding to the client ID is the second terminal device 5B, the client type is a printer.

The action table (see FIG. 3B) is a table in which an action ID and an action type, which is a content of a specific action corresponding to the action ID, are associated with each other. A periodic flag is a flag indicating whether an action corresponding to the action ID is an action executed as periodic processing. An action in which the periodic flag is true is an action executed as the periodic processing. An action in which the periodic flag is false is an action executed as temporary processing. An action content includes parameters necessary for executing an action.

The device table (see FIG. 3C) is a table in which terminal information of the first terminal device 5A and the second terminal device 5B is registered. In a case of the first terminal device 5A, the terminal information is collected from the first terminal device 5A by the relay device 4 and uploaded to the terminal management device 3. In a case of the second terminal device 5B, the terminal information is uploaded to the terminal management device 3 by the second terminal device 5B. A device ID is an ID assigned to each of the first terminal device 5A and the second terminal device 5B. The client ID is an ID assigned to the relay device 4 and the second terminal device 5B. When the client ID corresponding to the device ID is an ID corresponding to the relay device 4, this indicates that the device associated with the device ID is the first terminal device 5A. When the client ID corresponding to the device ID is an ID corresponding to the second terminal device 5B, this indicates that the device associated with the device ID is the second terminal device 5B. A model name, a serial number, a firmware version and the parameters are examples of the terminal information.

The client-action intermediate table (see FIG. 3D) is a table in which an action ID indicating an action and a client ID of each of the relay device 4 and the second terminal device 5B by which the action is to be executed are registered in association with each other when the action to be executed by each of the relay device 4 and the second terminal device 5B occurs in response to a command transmitted from the centralized management device 2 to the terminal management device 3 or a command input by a user operation in the terminal management device 3, for example. When the terminal management device 3 receives an access to confirm the action from each of the relay device 4 and the second terminal device 5B, the terminal management device 3 confirms whether the client ID corresponding to each of the relay device 4 and the second terminal device 5B that has received the access is registered in the client-action intermediate table. When the client ID is registered, the terminal management device 3 generates action information with reference to the action table (see FIG. 3B) based on the action ID corresponding to the client ID, and returns the action information to the relay device 4 or the second terminal device 5B that has received the access.

The device-action intermediate table (see FIG. 3E) is a table in which an action ID indicating an action and a device ID of each of the first terminal device 5A and the second terminal device 5B by which the action is to be executed are registered in association with each other when the action to be executed by each of the first terminal device 5A and the second terminal device 5B occurs in response to a command transmitted from the centralized management device 2 to the terminal management device 3 or a command input by a user operation in the terminal management device 3, for example. When the terminal management device 3 receives an access to confirm the action from the relay device 4, the terminal management device 3 acquires the device ID of the first terminal device 5A present under the relay device 4 that has received the access with reference to the device table (see FIG. 3C).

On the other hand, when the terminal management device 3 receives an access to confirm the action from second terminal device 5B, the terminal management device 3 acquires the device ID of the second terminal device 5B that has received the access with reference to the device table (see FIG. 3C).

When the device ID of the first terminal device 5A or the second terminal device 5B is acquired, it is confirmed whether the acquired device ID is registered in the device-action intermediate table. When the client ID is registered, the terminal management device 3 generates action information with reference to the action table (see FIG. 3B) based on the action ID corresponding to the client ID, and returns the action information to the relay device 4 or the second terminal device 5B.

(3) Processing Executed by Terminal Management Device 3

Next, processing executed in the terminal management device 3 will be described. In the terminal management device 3, the CPU 311 executes the processing according to a terminal management processing program stored in the memory 312. More specifically, the processing shown in FIGS. 4A, 4B, 4C and 4D are executed in the terminal management device 3.

(3.1) Information Addition Processing

Figure 4A:
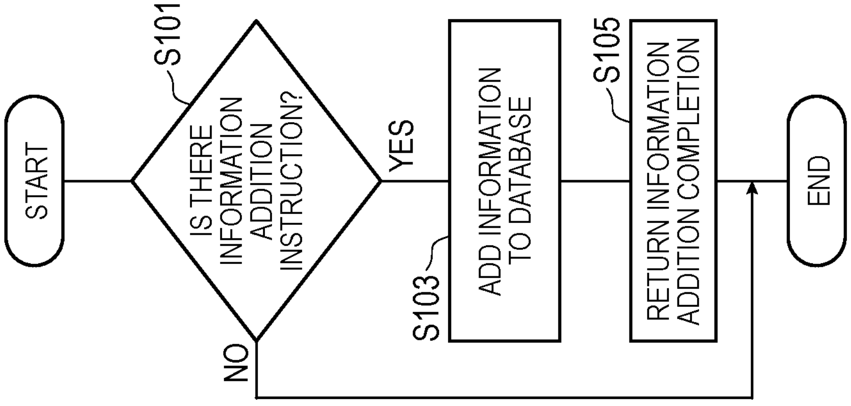
FIG. 4A is a flowchart of information addition processing in the terminal management device.

When information addition processing shown in FIG. 4A is started, the terminal management device 3 determines whether there is an information addition instruction (S101). When an instruction to the terminal management device 3, the relay device 4 or the terminal device 5 is input in the centralized management device 2 by a user operation in the centralized management device 2, the centralized management device 2 transmits information indicating the instruction content to the terminal management device 3 by an HTTP method "POST". When the relay device 4 and the second terminal device 5B request the terminal management device 3 to add terminal information, the relay device 4 and the second terminal device 5B transmit the terminal information to be added to the terminal management device 3 by the HTTP method "POST".

In S101, when the terminal management device 3 receives an access from the centralized management device 2, the relay device 4 or the second terminal device 5B using the HTTP method "POST", the terminal management device 3 determines that there is the information addition instruction (S101: YES), and adds information to the table in the DB 351 (S103). Subsequently, the terminal management device 3 returns information addition completion to the centralized management device 2, the relay device 4 or the second terminal device 5B that is a transmission source of the instruction (S105). When S105 ends, the information addition processing shown in FIG. 4A ends. When it is determined in S101 that there is no information addition instruction (S101: NO), the information addition processing shown in FIG. 4A ends without executing S103 and S105.

(3.2) Information Acquisition Processing

Figure 4B:
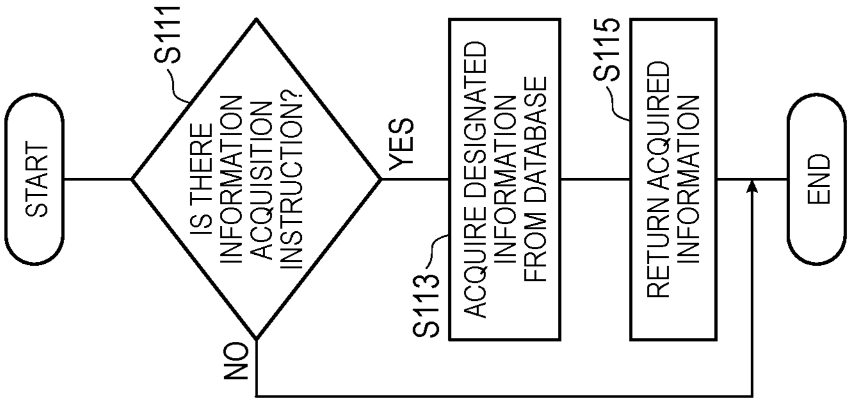
FIG. 4B is a flowchart of information acquisition processing in the terminal management device.

When information acquisition processing shown in FIG. 4B is started, the terminal management device 3 determines whether there is an information acquisition instruction (S111). When an instruction to acquire terminal information from the terminal device 5 is input in the centralized management device 2 by a user operation in the centralized management device 2, the centralized management device 2 transmits information indicating the instruction content to the terminal management device 3 by an HTTP method "GET". When the relay device 4 and the second terminal device 5B transmit an acquisition request of action information to the terminal management device 3, the relay device 4 and the second terminal device 5B transmit the acquisition request to the terminal management device 3 by the HTTP method “GET”.

In S111, when the terminal management device 3 receives an access from the centralized management device 2, the relay device 4 or the second terminal device 5B using the HTTP method “GET”, the terminal management device 3 determines that there is the information acquisition instruction (S111: YES), and acquires information designated by the centralized management device 2, the relay device 4 or the second terminal device 5B from the DB 351 (S113). Subsequently, the terminal management device 3 returns the acquired information to the centralized management device 2, the relay device 4 or the second terminal device 5B that is a transmission source of the instruction (S115). When S115 ends, the information acquisition processing shown in FIG. 4B ends. When it is determined in S111 that there is no information acquisition instruction (S111: NO), the information acquisition processing shown in FIG. 4B ends without executing S113 and S115.

(3.3) Information Update Processing

Figure 4C:
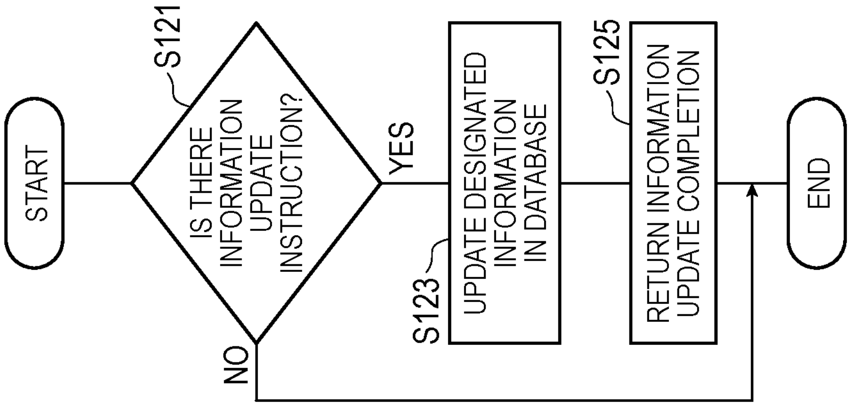
FIG. 4C is a flowchart of information update processing in the terminal management device.

When information update processing shown in FIG. 4C is started, the terminal management device 3 determines whether there is an information update instruction (S121). When the relay device 4 and the second terminal device 5B request the terminal management device 3 to update terminal information registered in the DB 351, the relay device 4 and the second terminal device 5B transmit the update request to the terminal management device 3 by an HTTP method “PUT”. In S121, when the terminal management device 3 receives an access from each of the relay device 4 and the second terminal device 5B using the HTTP method “PUT”, the terminal management device 3 determines that there is the information update instruction (S121: YES), and updates designated information in the DB 351 (S123). Subsequently, the terminal management device 3 returns information indicating that information update has been completed to the relay device 4 or the second terminal device 5B that is a transmission source of the instruction (S125). When S125 ends, the information update processing shown in FIG. 4C ends. When it is determined in S121 that there is no information update instruction (S121: NO), the information update processing shown in FIG. 4C ends without executing S123 and S125.

(3.4) Information Deletion Processing

Figure 4D:
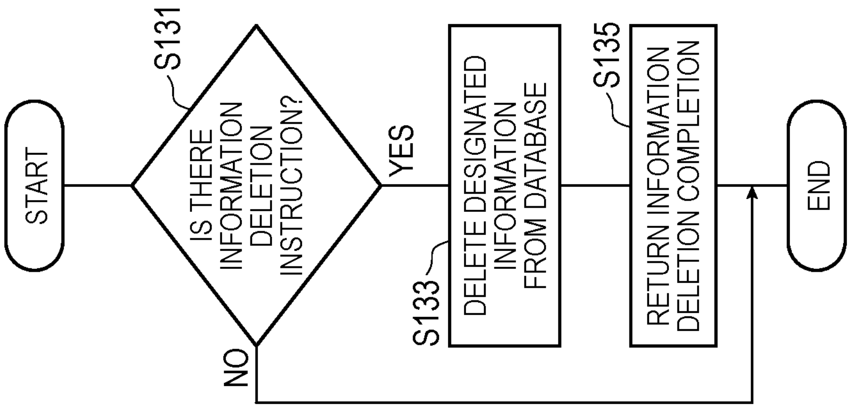
FIG. 4D is a flowchart of information deletion processing in the terminal management device.

When information deletion processing shown in FIG. 4D is started, the terminal management device 3 determines whether there is an information deletion instruction (S131). When the relay device 4 and the second terminal device 5B request the terminal management device 3 to delete temporary information, the relay device 4 and the second terminal device 5B transmit the deletion request to the terminal management device 3 by an HTTP method “DELETE”. In S131, when the terminal management device 3 receives an access from the relay device 4 and the second terminal device 5B using the HTTP method “DELETE”, the terminal management device 3 determines that there is the information deletion instruction (S131: YES), and deletes designated information from the DB 351 (S133). Subsequently, the terminal management device 3 returns information deletion completion to the relay device 4 or the second terminal device 5B that is a transmission source of the instruction (S135). When S135 ends, the information deletion processing shown in FIG. 4D ends. When it is determined in S131 that there is no information deletion instruction (S131: NO), the information update processing shown in FIG. 4D ends without executing S133 and S135.

(3.5) Information Providing Processing

Figure 5:
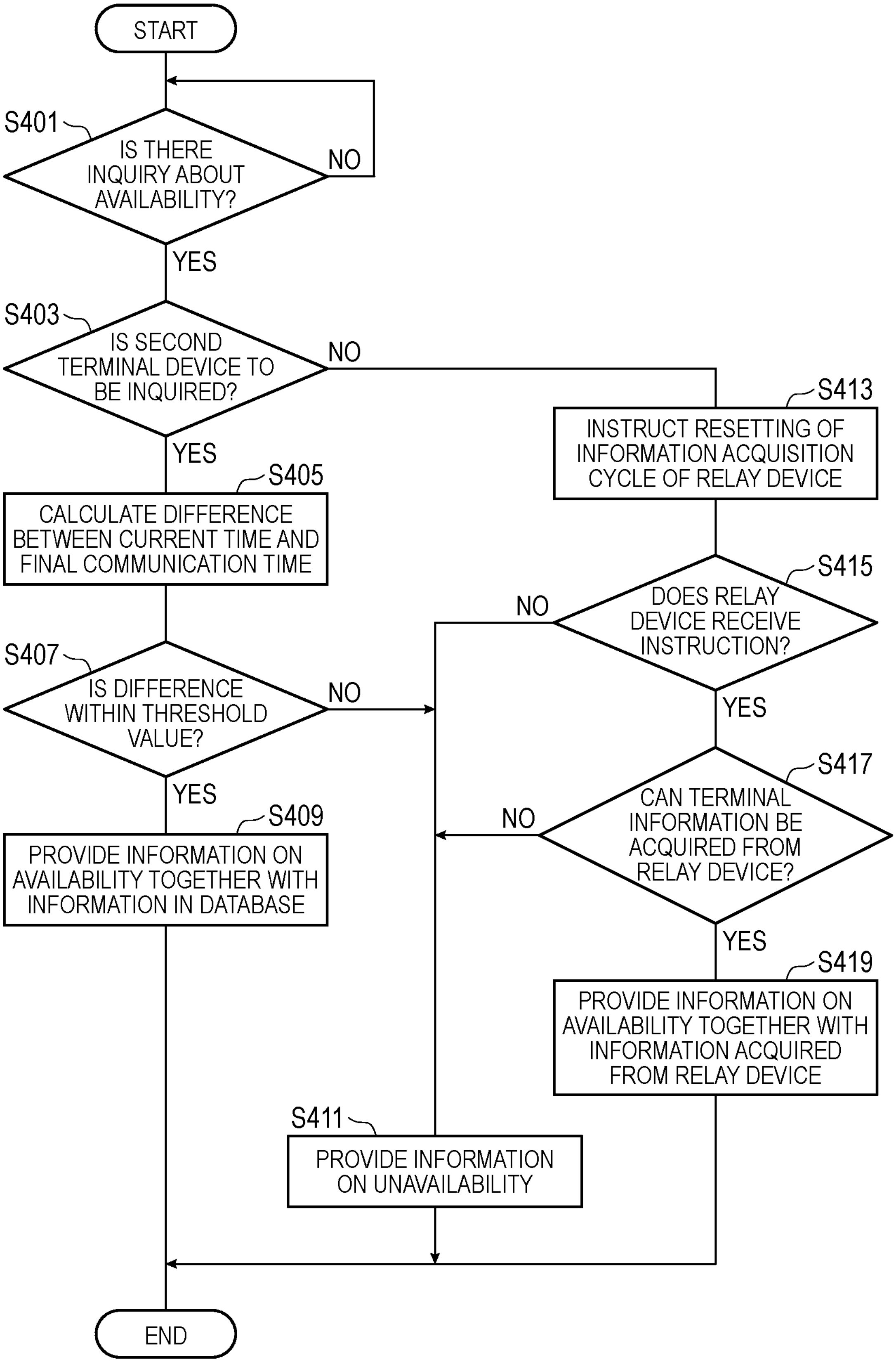
FIG. 5 is a flowchart of information providing processing in the terminal management device.

Next, information providing processing will be described with reference to FIG. 5. The information providing processing is processing constantly executed in the terminal management device 3. When the information providing processing is started, the terminal management device 3 determines whether there is an inquiry about availability (S401). More specifically, when a user operation for checking whether the first terminal device 5A or the second terminal device 5B is available is performed in the centralized management device 2, an inquiry about availability is transmitted from the centralized management device 2 to the terminal management device 3. In S401, the terminal management device 3 determines whether the inquiry about availability transmitted from the centralized management device 2 is received.

When there is no inquiry about availability in S401 (S401: NO), the processing returns to S401. Thereby, the terminal management device 3 waits for the inquiry about availability from the centralized management device 2. On the other hand, when there is the inquiry about availability in S401 (S401: YES), the processing proceeds to S403. When the processing proceeds to S403, the terminal management device 3 determines whether the second terminal device 5B is to be inquired (S403).

In S403, the terminal management device 3 extracts, from information included in the inquiry received from the centralized management device 2, a device ID corresponding to a device to be determined for availability. Subsequently, the terminal management device 3 searches for information in the device table shown in FIG. 3C using the extracted device ID as a key. Thereby, a client ID (for example, “AAA” in FIG. 3C) corresponding to the device ID (for example, “111” in FIG. 3C) is detected.

Subsequently, the terminal management device 3 searches for information in the client table shown in FIG. 3A using the detected client ID as a key. Thereby, a client type (for example, “service” in FIG. 3A) corresponding to the device ID (for example, “AAA” in FIG. 3A) is detected. The client type detected here is either “service” or “printer”.

When the client type is “service”, a device corresponding to the device ID included in the inquiry is a device capable of transmitting information via the relay device 4. Therefore, the terminal management device 3 can specify that the first terminal device 5A is to be inquired.

When the client type is “printer”, a device corresponding to the device ID included in the inquiry is a device capable of directly transmitting information without passing through the relay device 4. Therefore, the terminal management device 3 can specify that the second terminal device 5B is to be inquired.

In S403, when the second terminal device 5B is to be inquired (S403: YES), the terminal management device 3 calculates a difference between a current time and a final communication time (S405). The final communication time referred to in S405 is a time when the second terminal device 5B and the terminal management device 3, which are to be inquired, finally communicate with each other. The second terminal device 5B is configured to start communication with the terminal management device 3 when a power switch is turned on, and inquire of the terminal management device 3 whether there is an instruction to the second terminal device 5B each time a predetermined time elapses. Each time an inquiry from the second terminal device 5B arrives, the terminal management device 3 updates the final communication time with the second terminal device 5B. In S405, the difference between the final communication time and the current time is calculated.

Subsequently, the terminal management device 3 determines whether the difference is within a threshold value (S407). In the present embodiment, the threshold value is set to 30 seconds, and in S407, it is determined whether the difference is within 30 seconds. As the threshold, when the second terminal device 5B is functioning normally, a time is set such that communication between the terminal management device 3 and the second terminal device 5B is executed at least once within a period until the time set as the threshold value elapses.

In S407, when the difference is within the threshold value (S407: YES), the terminal management device 3 provides information on availability together with information in the DB 351 (S409). In S409, information on the second terminal device 5B is acquired from the DB 351 of the terminal management device 3, and the information is provided from the terminal management device 3 to the centralized management device 2. As an example, the information acquired from the DB 351 include a remaining amount of consumables (for example, a remaining amount of paper, a remaining amount of ink and a remaining battery capacity) of the second terminal device 5B, a battery life, and the like. However, information other than these may be used.

In a case where there is a change in the information such as the remaining amount of the consumables in the second terminal device 5B, the information is transmitted from the second terminal device 5B to the terminal management device 3 when the second terminal device 5B and the terminal management device 3 periodically communicate with each other. The terminal management device 3 registers information in the DB 351 from the second terminal device 5B. Thereby, even when some change occurs on a second terminal device 5B side, the terminal management device 3 can update the information in the DB 351 to the latest information at a frequency the same as a communication frequency with the second terminal device 5B.

Therefore, even if information registered in the DB 351 is provided to the centralized management device 2 in S409, the information can be considered to be substantially the same as the latest information on the second terminal device 5B. When such information is provided to the centralized management device 2, the terminal management device 3 does not need to acquire the latest information on the second terminal device 5B from the second terminal device 5B when receiving an inquiry from the centralized management device 2. Therefore, a response can be quickly returned from the terminal management device 3 to the centralized management device 2 accordingly. When S409 ends, the information providing processing shown in FIG. 5 ends.

On the other hand, when the difference is not within the threshold value in S407 (S407: NO), the terminal management device 3 provides information on unavailability (S411). In S411, information indicating that the second terminal device 5B is unavailable is provided from the terminal management device 3 to the centralized management device 2. As described above, when the second terminal device 5B is operating normally, the second terminal device 5B and the terminal management device 3 should periodically communicate with each other. However, when the difference is not within the threshold value, the second terminal device 5B and the terminal management device 3 do not periodically communicate with each other. Therefore, in this case, since it is considered that the second terminal device 5B is not operating, or even if the second terminal device 5B is operating, communication is impossible, the terminal management device 3 regards that the second terminal device 5B is unavailable, and provides information indicating that the second terminal device 5B is unusable to the centralized management device 2. When S411 ends, the information providing processing shown in FIG. 5 ends.

In S403, when the second terminal device 5B is not to be inquired (S403: NO), the terminal management device 3 instructs resetting of an information acquisition cycle of the relay device 4 (S413). The relay device 4 acquires information on the first terminal device 5A according to a predetermined information acquisition period. Therefore, when the relay device 4 waits for a next timing to acquire the information on the first terminal device 5A, it takes time to acquire the information accordingly. Therefore, in S413, the terminal management device 3 instructs the relay device 4 to reset the information acquisition cycle, and the relay device 4 that has received the instruction resets the information acquisition cycle even during the information acquisition cycle. Thereby, the relay device 4 is in the same situation as when the next information acquisition timing arrives, and the information on the first terminal device 5A is acquired immediately and provided to the relay device 4.

Subsequently, the terminal management device 3 determines whether the relay device 4 receives an instruction (S415). The relay device 4 inquires of the terminal management device 3 about presence or absence of the instruction. When there is the instruction to the relay device 4, the terminal management device 3 that has received the inquiry returns the instruction to the relay device 4 as a response to the inquiry. Therefore, in S415, it is determined whether processing of returning the instruction to the relay device 4 in response to the inquiry from the relay device 4 is executed within a period until a predetermined time elapses after S413 is executed.

In S415, when the relay device 4 has not received the instruction (S415: NO), it is considered that, for example, the relay device 4 is not operating, or even if the relay device 4 is operating, the inquiry from the relay device 4 does not reach the terminal management device 3. Therefore, in this case, since the terminal management device 3 and the relay device 4 cannot communicate normally, the processing proceeds to S411 described above, and the terminal management device 3 provides information on unavailability (S411). In S411, the information indicating that the first terminal device 5A is unavailable is provided from the terminal management device 3 to the centralized management device 2. When S411 ends, the information providing processing shown in FIG. 5 ends.

On the other hand, when the relay device 4 receives the instruction in S415 (S415: YES), the terminal management device 3 determines whether terminal information can be acquired from the relay device 4 (S417). When the relay device 4 acquires the terminal information from the first terminal device 5A and transmits the terminal information to the terminal management device 3, the terminal management device 3 acquires the terminal information in S417. Even if the relay device 4 cannot acquire the terminal information from the first terminal device 5A or the relay device 4 can acquire the terminal information from the first terminal device 5A, when the terminal information cannot be transmitted to the terminal management device 3, the terminal management device 3 cannot acquire the terminal information in S417.

Therefore, in S417, when the terminal information cannot be acquired from the relay device 4 (S417: NO), the processing proceeds to S411 described above, and the terminal management device 3 provides information on unavailability (S411). In S411, the information indicating that the first terminal device 5A is unavailable is provided from the terminal management device 3 to the centralized management device 2. When S411 ends, the information providing processing shown in FIG. 5 ends.

On the other hand, in S417, when the terminal information can be acquired from the relay device 4 (S417: YES), the terminal management device 3 provides information on availability together with information acquired from the relay device (S419). In S419, the terminal information acquired from the relay device 4 in S417 is provided from the terminal management device 3 to the centralized management device 2. As an example, the information acquired from the relay device 4 includes a remaining amount of consumables (for example, a remaining amount of paper, a remaining amount of ink and a remaining battery capacity) of the first terminal device 5A, a battery life, and the like. However, information other than these may be used.

The information on the second terminal device 5B acquired from the DB 351 in S409 and the information on the first terminal device 5A acquired from the first terminal device 5A via the relay device 4 in S419 are information having the same content. When S419 ends, the information providing processing shown in FIG. 5 ends.

(4) Operation Example of Terminal Management System 1

(4.1) Operation Example 1

Figure 6:
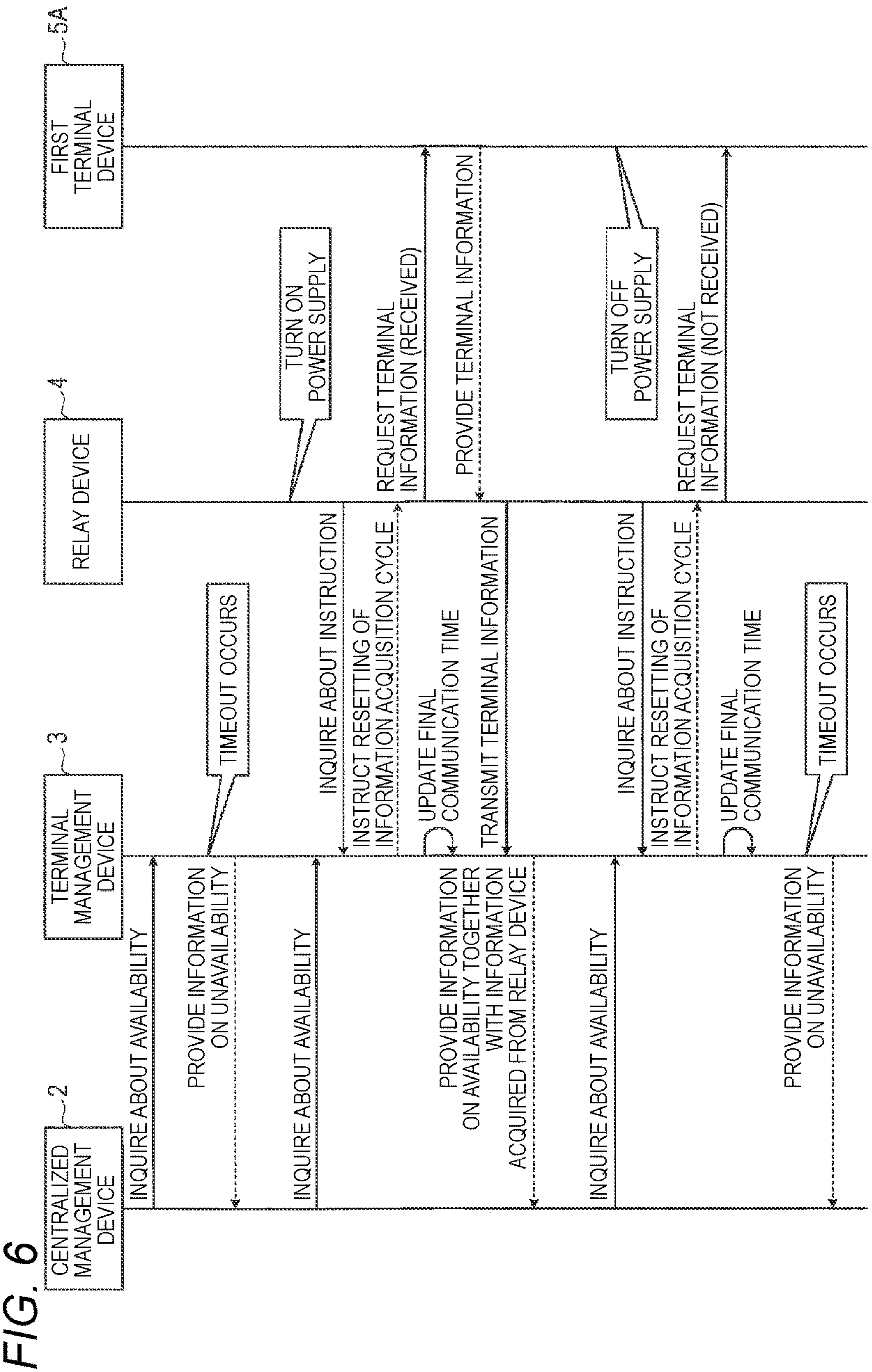
FIG. 6 is a sequence diagram showing a first example of a communication procedure when information on a first terminal device is provided to the centralized management device.

Next, an operation example 1 of the terminal management system 1 will be described. FIG. 6 shows a first example of a communication procedure when information on the first terminal device 5A is provided to the centralized management device 2. When an inquiry about availability is transmitted from the centralized management device 2 to the terminal management device 3 by a user operation in the centralized management device 2, the terminal management device 3 registers action information corresponding to the inquiry in the DB 351.

However, in the example shown in FIG. 6, the relay device 4 is not operating at a time point when the inquiry is transmitted from the centralized management device 2 to the terminal management device 3. Therefore, a time elapses without an inquiry about instruction being transmitted from the relay device 4 to the terminal management device 3. As a result, in the terminal management device 3, a timeout occurs at a timing when a predetermined time has elapsed since the inquiry from the centralized management device 2 is received. In this case, the terminal management device 3 provides the centralized management device 2 with information indicating that the first terminal device 5A is unavailable.

Thereafter, at a timing shown in FIG. 6, a power supply of the relay device 4 may be turned on. In this case, the relay device 4 periodically inquires of the terminal management device 3 about the instruction. In such a situation, when an inquiry about availability is transmitted from the centralized management device 2 to the terminal management device 3 by a user operation in the centralized management device 2, the terminal management device 3 registers action information corresponding to the inquiry in the DB 351.

Thereafter, when the relay device 4 inquires of the terminal management device 3 about the instruction, the terminal management device 3 transmits an instruction of resetting an information acquisition cycle to the relay device 4 based on the action information registered in the DB 351. At this time, the terminal management device 3 updates a final communication time with the relay device 4. When the above reset instruction is transmitted from the terminal management device 3 to the relay device 4, the relay device 4 requests the first terminal device 5A to transmit the terminal information.

When the first terminal device 5A is capable of receiving a request from the relay device 4, the first terminal device 5A provides terminal information to the relay device 4. The relay device 4 acquires the terminal information from the first terminal device 5A and transmits the terminal information to the terminal management device 3. The terminal management device 3 transmits information indicating that the first terminal device 5A is available together with the information acquired from the relay device 4 to the centralized management device 2.

Thereafter, at a timing shown in FIG. 6, a power supply of the first terminal device 5A may be turned off. In this case, when an inquiry about availability is transmitted from the centralized management device 2 to the terminal management device 3 by a user operation in the centralized management device 2, the terminal management device 3 registers action information corresponding to the inquiry in the DB 351.

Thereafter, when the relay device 4 inquires of the terminal management device 3 about the instruction, the terminal management device 3 transmits an instruction of resetting an information acquisition cycle to the relay device 4 based on the action information registered in the DB 351. At this time, the terminal management device 3 updates a final communication time with the relay device 4. When the above reset instruction is transmitted from the terminal management device 3 to the relay device 4, the relay device 4 requests the first terminal device 5A to transmit the terminal information.

However, when the power supply of the first terminal device 5A is turned off, the first terminal device 5A cannot receive a request from the relay device 4. Therefore, the relay device 4 cannot acquire the terminal information from the first terminal device 5A, and a time elapses in this state. As a result, in the terminal management device 3, a timeout occurs at a timing when a predetermined time has elapsed since the inquiry from the centralized management device 2 is received. In this case, the terminal management device 3 provides the centralized management device 2 with information indicating that the first terminal device 5A is unavailable.

Figure 8:
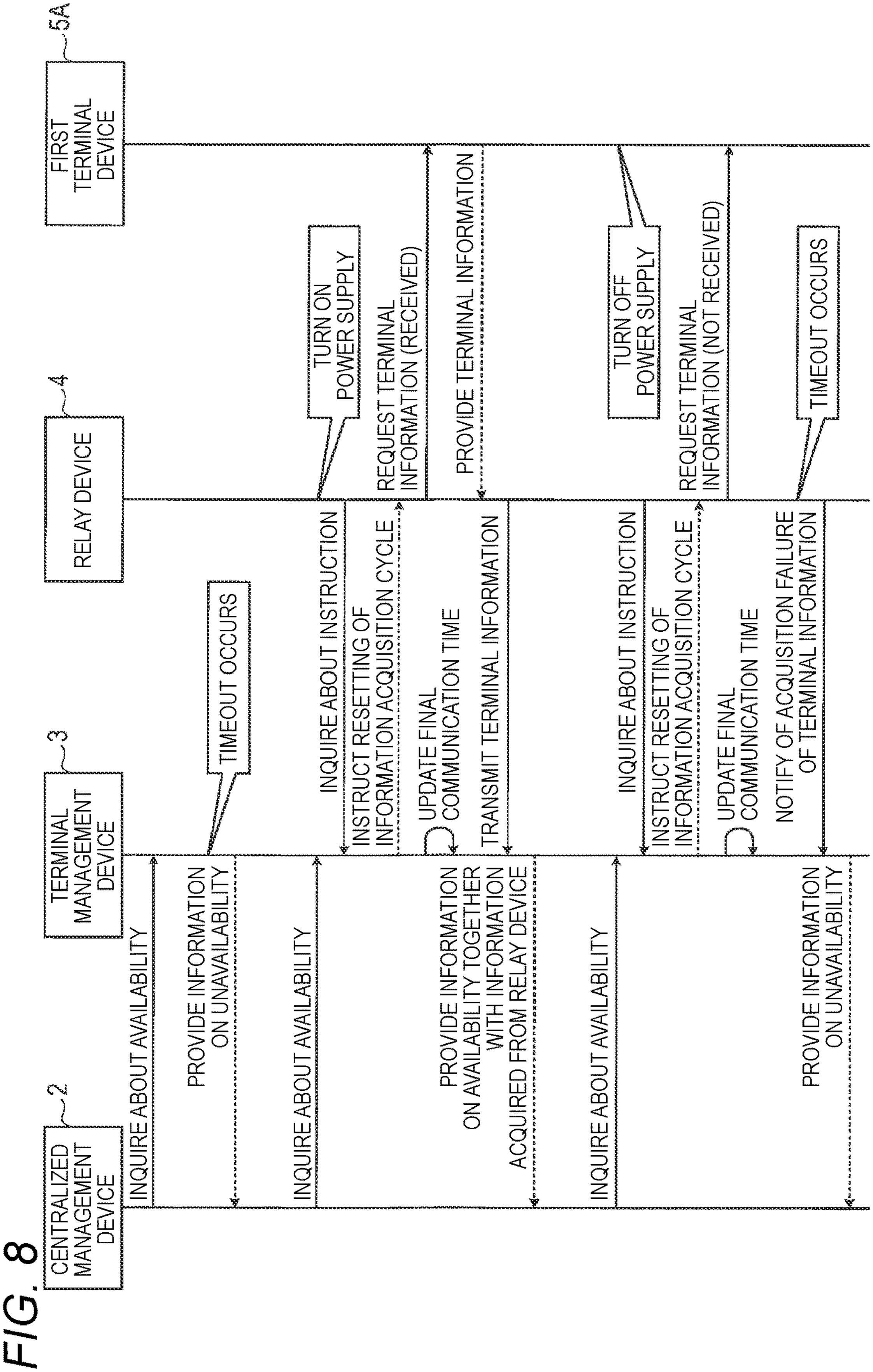
FIG. 8 is a sequence diagram showing a second example of the communication procedure when the information of the first terminal device is provided to the centralized management device.

In the example shown in FIG. 6, as described above, when the timeout occurs in the terminal management device 3, the terminal management device 3 provides the centralized management device 2 with the information indicating that the first terminal device 5A is unavailable. However, the present invention is not limited to such an example. For example, as in an example shown in FIG. 8, a configuration in which a timeout occurs in the relay device 4 may be adopted. In this example, when the timeout occurs in the relay device 4, the relay device 4 notifies the terminal management device 3 that acquisition of terminal information has failed. Upon receiving the notification, the terminal management device 3 provides the centralized management device 2 with information indicating that the first terminal device 5A is unavailable.

(4.2) Operation Example 2

Figure 7:
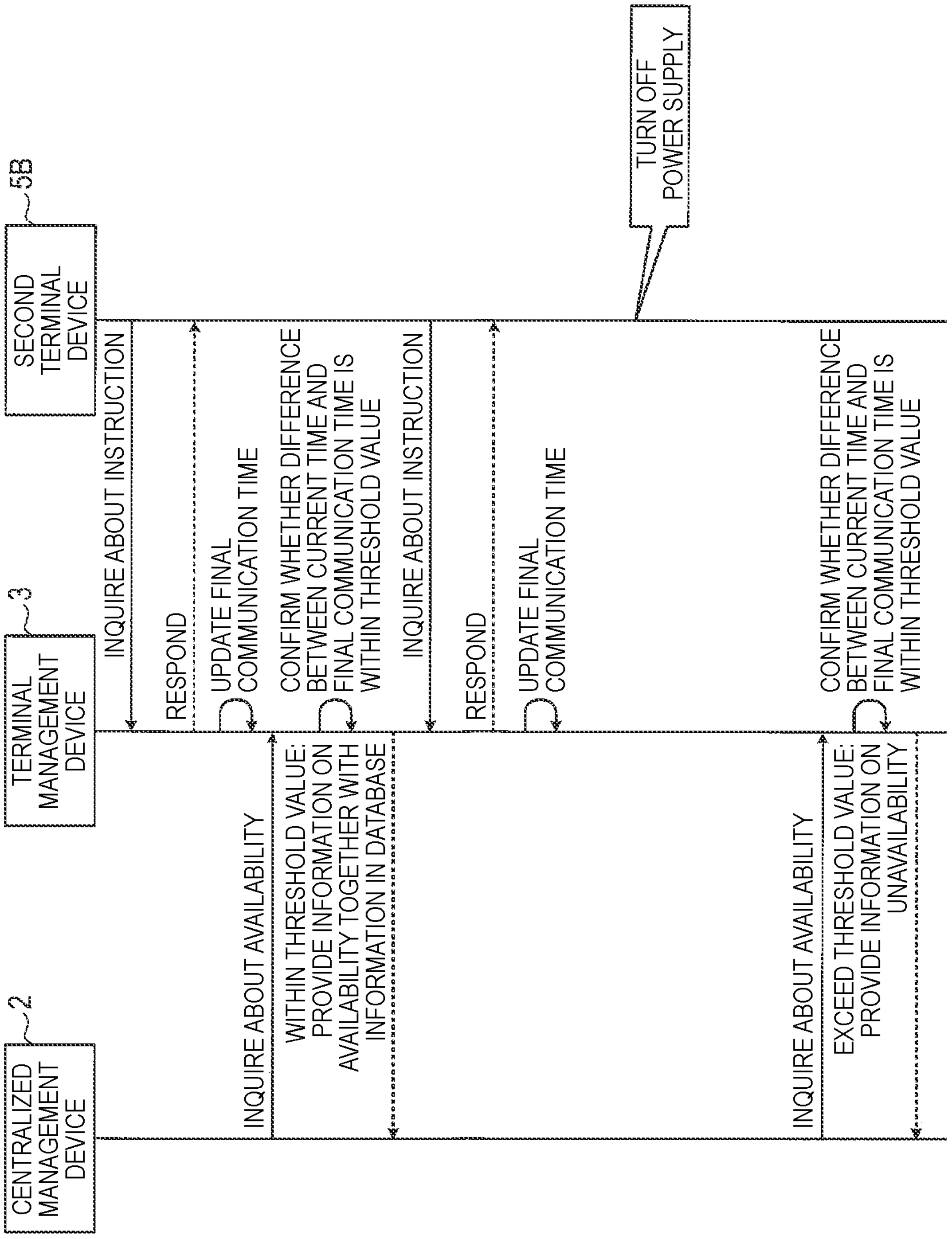
FIG. 7 is a sequence diagram showing an example of a communication procedure when information of a second terminal device is provided to the centralized management device.

Next, an operation example 2 of the terminal management system 1 will be described. FIG. 7 shows an example of a communication procedure when information on the second terminal device 5B is provided to the centralized management device 2. When the second terminal device 5B is operating, the second terminal device 5B periodically inquires of the terminal management device 3 about an instruction. This periodic inquiry behaves in the same manner as the relay device 4 described above. At the time of the periodic inquiry, information such as a remaining amount of consumables that has changed in the second terminal device 5B is transmitted to the terminal management device 3. This information is registered in the DB 351 in the terminal management device 3.

Upon receiving an inquiry from the second terminal device 5B, the terminal management device 3 returns a response to the inquiry. At this time, the terminal management device 3 updates a final communication time with the second terminal device 5B. In the present embodiment, when the second terminal device 5B is operating, the above communication is periodically executed at a high frequency of about once every ten to several tens of seconds.

In such a situation, when an inquiry about availability is transmitted from the centralized management device 2 to the terminal management device 3 by a user operation in the centralized management device 2, the terminal management device 3 confirms whether a difference between a current time and a final communication time is within a threshold value. As a result of the confirmation, when the difference is within the threshold value (for example, within 30 seconds), the terminal management device 3 transmits information that the second terminal device 5B is available together with the information of the second terminal device 5B registered in the DB 351 to the centralized management device 2.

Thereafter, at a timing shown in FIG. 7, a power supply of the second terminal device 5B may be turned off. In this case, when an inquiry about availability is transmitted from the centralized management device 2 to the terminal management device 3 by a user operation in the centralized management device 2, the terminal management device 3 confirms whether the difference between the current time and the final communication time is within the threshold value. As a result of the confirmation, when the difference exceeds the threshold value (for example, exceeds 30 seconds), the terminal management device 3 transmits information that the second terminal device 5B is unavailable to the centralized management device 2.

That is, when communication that should be executed periodically if the second terminal device 5B is operating is not executed for a long time that exceeds the threshold value, the terminal management device 3 determines that the second terminal device 5B is unavailable accordingly.

(5) Effects

According to the terminal management system 1 described above, the terminal management device 3 determines whether the first terminal device 5A is in a state capable of transmitting information to the terminal management device 3 via the relay device 4 in a first control shown in S413 to S417 for the first terminal device 5A. The terminal management device 3 determines whether the second terminal device 5B is in a state capable of transmitting information to the terminal management device 3 in a second control shown in S405 to S407 (that is, a second control different from the first control) for the second terminal device 5B. Therefore, although the terminal management system 1 contains a mixture of a first system (that is, a system that manages the first terminal device 5A) and a second system (that is, a system that manages the second terminal device 5B) having different information transmission paths, each of the first terminal device 5A and the second terminal device 5B can be appropriately managed.

In particular, in the present embodiment, when the first terminal device 5A is to be inquired about availability, the terminal management device 3 attempts to acquire information from the first terminal device 5A via the relay device 4 after receiving an inquiry from the centralized management device 2. When information acquisition is successful, information indicating that the first terminal device 5A is available is transmitted to the centralized management device 2.

On the other hand, when the second terminal device 5B is to be inquired about availability, the terminal management device 3 transmits information indicating that the second terminal device 5B is available to the centralized management device 2, if a time before an inquiry is received from the centralized management device 2 and when the second terminal device 5B last provides the information is sufficiently close to a time when the inquiry is received from the centralized management device 2.

Therefore, for the first terminal device 5A, availability of the first terminal device 5A can be reliably grasped by communicating only when necessary without imposing an excessive communication load. On the other hand, for the second terminal device 5B, availability of the second terminal device 5B can be estimated based on a communication history of the second terminal device 5B by using a fact that the second terminal device 5B communicates with the terminal management device 3 at a high frequency.

(6) Other Embodiments

Although a terminal management device, a terminal management system, a control method and a program have been described above by way of an exemplary embodiment, the above embodiment is merely an example of the present disclosure. That is, the present disclosure is not limited to the exemplary embodiment described above, and can be implemented in various forms without departing from the technical idea of the present disclosure.

For example, in the above embodiment, as an example of the terminal device 5, the mobile printer and the printer or the MFP compatible with the wireless LAN are exemplified, but whether the terminal device 5 has a printer function is not limited. For example, the terminal device 5 may be a personal computer (PC), a smartphone or the like. Alternatively, the terminal device 5 may be an industrial machine or a business device configured to be remotely controlled and remotely managed via a network (for example, an industrial sewing machine, an automatic vending machine, a business washing machine, a medical device or the like). Alternatively, a home electric appliance configured to be remotely operated and remotely managed via a network (for example, a refrigerator, a television, an air conditioner, a washing machine or the like) may be used.

In the above embodiment, the LAN 8 is configured by combining both the wired LAN and the wireless LAN, but the LAN 8 may include only one of the wired LAN and the wireless LAN.

In addition to the above, for example, a plurality of functions realized by one component exemplified in the above embodiment may be realized by a plurality of components. One function realized by one component exemplified in the above embodiment may be realized by a plurality of components. A plurality of functions realized by a plurality of components exemplified in the above embodiment may be realized by one component. One function realized by a plurality of components exemplified in the above embodiment may be realized by one component. A part of the configuration shown in the above embodiment may be omitted.

As is clear from the exemplary embodiment described above, the terminal management device according to the present disclosure may further include the following configuration.

(A) In the first control, the processor may determine whether the first terminal device is in a state capable of transmitting information to the terminal management device via the relay device, based on communication between the terminal management device and the relay device executed after a start time point of the first control. In the second control, the processor may be configured to determine whether the second terminal device is in a state capable of transmitting information to the terminal management device, based on communication between the terminal management device and the second terminal device executed before a start time point of the second control.

According to the terminal management device configured as described above, the terminal management device executes communication between the terminal management device and the relay device after the start time point of the first control, and determines whether the first terminal device is in the state capable of transmitting information to the terminal management device via the relay device. In addition, the terminal management device determines whether the second terminal device is in the state capable of transmitting information to the terminal management device, based on a communication history between the terminal management device and the second terminal device executed before the start time point of the second control. Therefore, although the first system and the second system are mixed, each of the first terminal device and the second terminal device can be appropriately managed by a method suitable for each of the first system and the second system.

(B) A frequency of communication with the second terminal device may be higher than a frequency at which information is transmitted from the first terminal device via the relay device.

According to the terminal management device configured as described above, each of the first terminal device and the second terminal device can be appropriately managed by the method suitable for each of the first system and the second system according to the frequency of information transmission from the first terminal device and the frequency of communication with the second terminal device.

(C) In the first control, the processor may determine whether the first terminal device is in the state capable of transmitting information to the terminal management device via the relay device, based on whether information from the first terminal device is transmitted from the relay device to the terminal management device within a time from when the first control is started to when a predetermined first time has elapsed. In the second control, the processor may determine whether the second terminal device is in the state capable of transmitting information to the terminal management device, based on whether a time, from when the terminal management device and the second terminal device last communicate with each other to when the second control is started, is within a predetermined second time.

According to the terminal management device configured as described above, the terminal management device determines whether the first terminal device is in the state capable of transmitting information to the terminal management device via the relay device, based on whether information from the first terminal device is transmitted from the relay device to the terminal management device within the time from when the first control is started to when the first time has elapsed. In addition, the terminal management device determines whether the second terminal device is in the state capable of transmitting information to the terminal management device, based on whether the time, from when the terminal management device and the second terminal device last communicate with each other to when the second control is started, is within the predetermined second time. Therefore, although the first system and the second system are mixed, each of the first terminal device and the second terminal device can be appropriately managed by a method suitable for each of the first system and the second system.

(D) The terminal management device may include a storage in which information indicating whether a communication target configured to communicate with the terminal management device is the relay device or the second terminal device is registered in association with the communication target. The terminal management device may be configured to determine whether the communication target is the relay device or the second terminal device based on the registered information.

According to the terminal management device configured as described above, the terminal management device determines whether the communication target is the relay device or the second terminal device based on the registered information, transmits information suitable for each of the relay device and the second terminal device, and thus can appropriately manage each of the first terminal device and the second terminal device.

(E) In the terminal management system, the control method and the non-transitory computer-readable medium according to the present disclosure, the terminal management device may include the above configurations (A) to (D).

What is claimed is:

1. A terminal management device in a terminal management system in which a first system and a second system coexist, wherein the first system includes the terminal management device, a relay device, and a first terminal device, wherein the relay device is configured to enable the terminal management device to communicate with the first terminal device, and in a case of transferring information between the terminal management device and the first terminal device, the information is transferred passing through the relay device, and wherein the second system includes the terminal management device and a second terminal device, wherein the terminal management device is configured to communicate with the second terminal device, the information is transferred directly to the second terminal device without passing through the relay device, the terminal management device comprising a controller configured to perform:

a first control of acquiring information from the relay device without directly communicating with the first terminal device for determining whether the first terminal device is in a state in which the first terminal device is capable of transmitting the information to the terminal management device via the relay device, and a second control of acquiring information directly from the second terminal device without using the relay device for determining whether the second terminal device is in a state in which the second terminal device is capable of transmitting the information to the terminal management device;

wherein in the performing of the first control, the controller is configured to determine whether the first terminal device is in the state capable of transmitting the information to the terminal management device via the relay device, based on whether the information from the first terminal device is transmitted from the relay device to the terminal management device within a time from when the first control is started to when a predetermined first time has elapsed, and wherein in the performing of the second control, the controller is configured to determine whether the second terminal device is in the state capable of transmitting the information to the terminal management device, based on whether a time, from when the terminal management device and the second terminal device last communicate with each other to when the second control is started, is within a predetermined second time.

2. The terminal management device according to claim 1, wherein in the performing of the first control, the controller is configured to determine whether the first terminal device is in the state capable of transmitting the information to the terminal management device via the relay device, based on communication between the terminal management device and the relay device executed after a start time point of the first control, and wherein in the performing of the second control, the controller is configured to determine whether the second terminal device is in the state capable of transmitting the information to the terminal management device, based on communication between the terminal management device and the second terminal device executed before a start time point of the second control.

3. The terminal management device according to claim 2, wherein a frequency of the communication with the second terminal device is higher than a frequency at which the information is transmitted from the first terminal device via the relay device.

4. The terminal management device according to claim 1, further comprising:

a storage, information indicating whether a communication target configured to communicate with the terminal management device is the relay device or the second terminal device being registered in the storage in association with the communication target, wherein the terminal management device is configured to determine whether the communication target is the relay device or the second terminal device based on the registered information.

5. A terminal management system comprising:

a first system including a terminal management device a relay device, and a first terminal device; and a second system coexisting with the first system and including the terminal management device and a second terminal device wherein the relay device is configured to enable the terminal management device to communicate with the first terminal device, and in a case of transferring information between the terminal management device and the first terminal device, the information is transferred passing through the relay device, and wherein the terminal management device is configured to communicate with the second terminal device, the information is transferred directly to the second terminal device without passing through the relay device, wherein the terminal management device includes a controller configured to perform:

a first control of acquiring information from the relay device without directly communicating with the first terminal device for determining whether the first terminal device is in a state in which the first terminal device is capable of transmitting the information to the terminal management device via the relay device, and a second control of acquiring information directly from the second terminal device without using the relay device for determining whether the second terminal device is in a state in which the second terminal device capable of transmitting the information to the terminal management device;

wherein in the performing of the first control, the controller is configured to determine whether the first terminal device is in the state capable of transmitting the information to the terminal management device via the relay device, based on whether the information from the first terminal device is transmitted from the relay device to the terminal management device within a time from when the first control is started to when a predetermined first time has elapsed, and wherein in the performing of the second control, the controller is configured to determine whether the second terminal device is in the state capable of transmitting the information to the terminal management device, based on whether a time, from when the terminal management device and the second terminal device last communicate with each other to when the second control is started, is within a predetermined second time.

6. A control method executed by a terminal management device in a terminal management system in which a first system and a second system coexist, wherein the first system includes the terminal management device, a relay device, and a first terminal device, wherein the relay device is configured to enable the terminal management device to communicate with the first terminal device, and in a case of transferring information between the terminal management device and the first terminal device, the information is transferred passing through the relay device, and wherein the second system includes the terminal management device and a second terminal device, wherein the terminal management device is configured to communicate with the second terminal device, the information is transferred directly to the second terminal device without passing through the relay device, the control method comprising:

a first control of acquiring information from the relay device without directly communicating with the first terminal device for determining whether the first terminal device is in a state in which the first terminal device is capable of transmitting the information to the terminal management device via the relay device; and a second control of acquiring information directly from the second terminal device without using the relay device for determining whether the second terminal device is in a state in which the second terminal device is capable of transmitting the information to the terminal management device;

wherein the first control includes determining whether the first terminal device is in the state capable of transmitting the information to the terminal management device via the relay device, based on whether the information from the first terminal device is transmitted from the relay device to the terminal management device within a time from when the first control is started to when a predetermined first time has elapsed, and wherein the second control includes determining whether the second terminal device is in the state capable of transmitting the information to the terminal management device, based on whether a time, from when the terminal management device and the second terminal device last communicate with each other to when the second control is started, is within a predetermined second time.

7. The control method according to claim 6, wherein the first control comprises determining whether the first terminal device is in the state capable of transmitting the information to the terminal management device via the relay device, based on communication between the terminal management device and the relay device executed after a start time point of the first control, and wherein the second control comprises determining whether the second terminal device is in the state capable of transmitting the information to the terminal management device, based on communication between the terminal management device and the second terminal device executed before a start time point of the second control.

8. The control method according to claim 6, wherein a frequency of the communication with the second terminal device is higher than a frequency at which the information is transmitted from the first terminal device via the relay device.

9. The control method according to claim 6, wherein the terminal management device includes a storage, information indicating whether a communication target configured to communicate with the terminal management device is the relay device or the second terminal device being registered in the storage, in association with the communication target, and wherein the control method comprises determining whether the communication target is the relay device or the second terminal device based on the registered information.

10. A non-transitory computer-readable medium storing instructions readable by a processor of a terminal management device in a terminal management system in which a first system and a second system coexist, wherein the first system includes the terminal management device, a relay device, and a first terminal device, wherein the relay device is configured to enable the terminal management device to communicate with the first terminal device, and in a case of transferring information between the terminal management device and the first terminal device, the information is transferred passing through the relay device, and wherein the second system includes the terminal management device and a second terminal device, wherein the terminal management device is configured to communicate with the second terminal device, the information is transferred directly to the second terminal device without passing through the relay device, the instructions, when executed by the processor, causing the terminal management device to perform:

a first control of acquiring information from the relay device without directly communicating with the first terminal device for determining whether the first terminal device is in a state in which the first terminal device is capable of transmitting the information to the terminal management device via the relay device; and a second control of acquiring information directly from the second terminal device without using the relay device for determining whether the second terminal device is in a state in which the second terminal device is capable of transmitting the information to the terminal management device; and wherein in the performing of the first control, the instructions, when executed by the processor, cause the terminal management device to determine whether the first terminal device is in the state capable of transmitting the information to the terminal management device via the relay device, based on whether the information from the first terminal device is transmitted from the relay device to the terminal management device within a time from when the first control is started to when a predetermined first time has elapsed, and wherein in the performing of the second control, the instructions, when executed by the processor, cause the terminal management device to determine whether the second terminal device is in the state capable of transmitting the information to the terminal management device, based on whether a time, from when the terminal management device and the second terminal device last communicate with each other to when the second control is started, is within a predetermined second time.

11. The non-transitory computer-readable medium according to claim 10, wherein in the performing of the first control, the instructions, when executed by the processor, cause the terminal management device to determine whether the first terminal device is in the state capable of transmitting the information to the terminal management device via the relay device, based on communication between the terminal management device and the relay device executed after a start time point of the first control, and wherein in the performing of the second control, the instructions, when executed by the processor, cause the terminal management device to determine whether the second terminal device is in the state capable of transmitting the information to the terminal management device, based on communication between the terminal management device and the second terminal device executed before a start time point of the second control.

12. The non-transitory computer-readable medium according to claim 11, wherein a frequency of the communication with the second terminal device is higher than a frequency at which the information is transmitted from the first terminal device via the relay device.

13. The non-transitory computer-readable medium according to claim 10, wherein the terminal management device includes a storage, information indicating whether a communication target configured to communicate with the terminal management device is the relay device or the second terminal device being registered in the storage, in association with the communication target, and wherein the instructions, when executed by the processor, cause the terminal management device to determine whether the communication target is the relay device or the second terminal device based on the registered information.

14. The terminal management device according to claim 1, wherein the predetermined first time and the predetermined second time are different.

15. The terminal management device according to claim 1, wherein the predetermined first time is longer than the predetermined second time.

16. The terminal management system according to claim 5, wherein the predetermined first time and the predetermined second time are different.

17. The terminal management system according to claim 5, wherein the predetermined first time is longer than the predetermined second time.

18. The control method according to claim 6, wherein the predetermined first time and the predetermined second time are different.

19. The control method according to claim 6, wherein the predetermined first time is longer than the predetermined second time.

20. The non-transitory computer-readable medium according to claim 10, wherein the predetermined first time and the predetermined second time are different.

21. The non-transitory computer-readable medium according to claim 10, wherein the predetermined first time is longer than the predetermined second time.

* * * * *